United States Patent
Eckenhausen et al.

(10) Patent No.: US 7,021,206 B2
(45) Date of Patent: Apr. 4, 2006

(54) HOT DAIRY-BASED BEVERAGE DISPENSER

(76) Inventors: Roland B. Eckenhausen, 162 Covina Ave., Long Beach, CA (US) 90803; Steven C. Eckenhausen, 24 Rivo Alto Canal, Long Beach, CA (US) 90803

( * ) Notice: Subject to any disclaimer, the term of this patent is extended or adjusted under 35 U.S.C. 154(b) by 162 days.

(21) Appl. No.: 10/175,578

(22) Filed: Jun. 18, 2002

(65) Prior Publication Data

US 2003/0232115 A1 Dec. 18, 2003

(51) Int. Cl.
*A01J 11/00* (2006.01)

(52) U.S. Cl. .................. 99/452; 99/323.3; 261/66; 261/72.1

(58) Field of Classification Search .................. 99/452, 99/323.3; 261/66, 72.1
See application file for complete search history.

(56) References Cited

U.S. PATENT DOCUMENTS

| 3,632,021 A | * | 1/1972 | MacManus ................ 222/95 |
| 3,811,294 A | * | 5/1974 | Taylor ........................ 62/390 |
| 4,620,953 A | | 11/1986 | Silla et al. |
| 4,645,603 A | * | 2/1987 | Frankl ....................... 210/629 |
| 4,715,274 A | | 12/1987 | Paoletti |
| 4,779,519 A | | 10/1988 | Giuliano |
| 5,207,148 A | | 5/1993 | Anderson et al. |
| 5,372,061 A | | 12/1994 | Albert et al. |
| 5,823,675 A | * | 10/1998 | Myerly ....................... 366/310 |
| 5,884,552 A | | 3/1999 | Lussi et al. |
| 6,095,372 A | | 8/2000 | Dorsey et al. |
| 6,192,785 B1 | | 2/2001 | Trida et al. |
| 6,253,667 B1 | | 7/2001 | Lussi et al. |
| 6,264,174 B1 | * | 7/2001 | Chang et al. ................ 261/29 |
| 6,289,796 B1 | | 9/2001 | Fung |
| 2002/0017321 A1 | * | 2/2002 | Schroeder ................... 137/240 |
| 2003/0085237 A1 | * | 5/2003 | Kateman et al. ............... 222/1 |

FOREIGN PATENT DOCUMENTS

WO  PCT/EP90/00122  10/1991

* cited by examiner

*Primary Examiner*—Anthony Weier
(74) *Attorney, Agent, or Firm*—Charles H. Thomas

(57) ABSTRACT

A dispensing unit for dispensing hot, dairy-based beverages has a self-contained refrigerated unit located above a venturi-type emulsification foaming head. The dispensing unit has particular applicability to the dispensation of foamy, hot milk for use in beverages such as cappuccino and nonfoamy, hot milk for use in beverages such as coffee latte, hot chocolate, and other hot dairy-based beverages. The refrigeration unit accommodates a "bag in box" cold milk storage container of the type widely used in food service establishments. The dispensing unit employs a pinch valve that avoids direct contact between the milk and the valve components. The refrigerated milk is stored above the level of the foamer head so that the flow of milk results partially from gravitational force on the milk, and is not totally dependent upon venturi suction created in the foamer head.

4 Claims, 4 Drawing Sheets

HOT DAIRY-BASED BEVERAGE DISPENSER

BACKGROUND OF THE INVENTION

1. Field of the Invention

The present invention relates to an improved system for emulsifying milk or other dairy-based liquids with other fluids and dispensing them for ultimate consumption in a hot beverage. The invention has particular applicability in the preparation of hot dairy-based beverages such as hot chocolate, cappuccino, coffee latte, flavored steamers (heated flavored milk), and other hot beverages containing dairy-based liquids.

2. Description of the Prior Art

Various systems have existed for quite a number of years for emulsifying dairy-based liquids, such as milk, with other fluids in the preparation of hot beverages. For example, U.S. Pat. No. 4,715,274 describes an emulsifier unit for emulsifying steam, air, and milk to prepare such beverages as cappuccino and coffee latte. In the preparation of such beverages steam and air are mixed with milk or cream in a venturi-type emulsification chamber and dispensed from this device, such as for mixing with coffee. The portions of steam and air that are mixed with the milk vary, depending upon the particular hot beverage desired. For example, cappuccino requires an aerated mixture of milk and air. Typically, this mixture is comprised of about two-thirds milk and about one-third air by volume. About half of the milk in a portion suitable for making cappuccino coffee is in a liquid form, while the other half is in the form of foam above the liquid. The milk and air is emulsified and heated with steam in the emulsification chamber and preferably dispensed at a temperature between 155° F. and 165° F. The steam is typically under a pressure of about fifteen to twenty-two pounds per square inch above ambient atmospheric pressure and is preferably injected into the emulsification chamber at 120° C.–125° C.

In making a coffee latte drink, on the other hand, only heated milk is employed, and air is not mixed with the milk and steam in the emulsification chamber. To the contrary, the air supply is completely shut off. The hot milk is preferably dispensed at a temperature of between 155° F. and 165° F.

Conventional emulsification systems for creating milk-based beverages, such as cappuccino and coffee latte, have a number of disadvantages. Specifically, conventional systems rely upon drawing the air and milk into the emulsification system due to the suctional force that results from a venturi effect in the emulsification chamber. Sometimes the flow of milk is aided by a pump. The milk is typically drawn from a separate, refrigerated supply location, at roughly the same or a lower level of elevation as the emulsification unit. The milk is sucked through a tube emanating from the top of the milk container and connected into the venturi inlet of the emulsifier unit. Another air inlet to the venturi system draws in ambient air. Suctional force is created by injecting steam under pressure through the venturi, whereby the rapid flow at the constriction of the venturi creates suctional force that is exerted on the milk, and in the case of cappuccino, on ambient air as well.

Conventional milk-based beverage dispensing systems based on venturi-induced emulsification of the type used in the preparation of cappuccino and coffee latte are notoriously inconsistent and temperamental. The temperature of the beverages dispensed in such systems fluctuates considerably, thereby varying the quality of the drink. In conventional systems the cold storage chamber for the milk is located next to, behind, and/or below the emulsifier. Consequently, as the level of milk within the container drops as beverages are dispensed, the amount of milk drawn in by the suction of the venturi drops as well, thus leading to inconsistent quantities of milk dispensed relative to the air drawn into the unit. Conventional systems employ suction and siphoning that is created solely by the subatmospheric pressure created and sustained by a venturi-based emulsifier, sometimes termed a foamer head.

Also, conventional systems involve milk flow through a number of components in the automated mixing system. For sanitation reasons applicable to food preparation establishments, cleaning of each and every component of the emulsifying, beverage dispensing unit with which milk or any other dairy product makes contact must occur on a daily basis. The NSF (National Sanitary Foundation) sets the standards in this regard in this country. The cleaning process is quite time consuming. Also, the individuals employed to perform the cleaning task often do so with different degrees of thoroughness. If cleaning is not performed according to existing specifications each time for each machine, the temperature at which the steam heated, milk-based beverage is dispensed and the air/milk ratio (for foamy milk) of the mixture becomes rather inconsistent.

Another problem that occurs in conventional venturi-based emulsification systems is that the temperature at which nonfoamy steamed milk is dispensed, such as for use in coffee latte, is lower than the temperature at which foamy steamed milk is dispensed. This is due to the fact that conventional emulsification systems maintain their steam supply (i.e. energy), fixed at one level for both beverages, whereas the mass of liquid that needs to be heated for foamy hot milk is less than the mass for nonfoamy hot milk, (per liquid ounce dispensed). This results in different temperatures for each mixture type. In some automated cappuccino and coffee latte dispensing systems this temperature differential is resolved by equipping the milk supply line or lines with different flow restrictors to regulate the milk flow and therefore the available mass to be heated. These prior systems create a redundancy in expense, have complicated plumbing systems to supply steam and milk to the venturi-based emulsifier unit, and are therefore difficult to assemble, disassemble, and clean.

SUMMARY OF THE INVENTION

It is an object of the present invention to provide a fresh dairy-based hot beverage dispensing system that greatly reduces or eliminates many of the problems associated with conventional systems. One primary feature of the present invention is to provide a system that employs a self-contained unit in which a refrigerated milk supply is located in a cabinet above the emulsification unit. This allows milk to descend from the refrigeration unit at least partially under the force of gravity. Thus, the amount of milk supplied varies less due to fluctuations in the strength of suction from the venturi orifice. Rather, there is a highly constant flow rate of milk dispensed with great consistency each and every time the unit is actuated.

Furthermore, this arrangement has particular applicability to a "bag in box" milk container. According to such an arrangement, an aseptic plastic bag is filled with milk and packaged within a protective corrugated paperboard or plastic box. The bag is entirely closed except for a flexible rubber or plastic dispensation hose having a proximal end connected to the bottom of the bag and a free, distal end that is initially sealed shut.

The "bag in box" container is positioned in a refrigerated milk storage chamber with the hose that emanates from the bag located at the bottom of the box. An opening is formed in the box near its bottom and the hose is drawn out to extend downwardly. The hose is inserted through a pinch valve, which may be closed by a weight or by some other means. Once the tube has been routed through the pinch valve, the tip of the tube is cut off so that if pressure upon the pinch valve is relieved, the milk flows downwardly due to the force of gravity acting on the milk. As the milk supply in the bag is used up, atmospheric pressure collapses the bag.

While "bag in box" milk containers have been utilized for many years in the dispensation of cold milk, they have not heretofore been employed in the dispensation of hot dairy-based beverages. The unique device for emulsifying fresh dairy and/or dairy-based liquids according to the present invention is constructed so as to accommodate a "bag in box" container above the emulsification unit. The hose of the "bag in box" container is directed downwardly through a pinch valve. The tip of the distal end of the hose is cut off and the severed end slides onto the milk inlet to the emulsification chamber. Thus, the necessity for any other connecting tubing from a disposable milk container to the emulsification unit is totally avoided. To the contrary, once the bag of the "bag in box" container is empty, the tip of the tube is removed from the inlet to the emulsification unit and pulled free of the pinch valve. The disposable "bag in box" container is then discarded and replaced.

A further unique feature of some embodiments of the invention is the provision of pressurized air for use in making cappuccino from a pressurized air supply. Air is thereby forced under pressure into the emulsification chamber. The dispensation unit of the present invention does not necessarily rely upon venturi suction to pull air into the unit. As a consequence, there is far greater consistency in the amount of air in the frothed, heated milk used for the preparation of cappuccino beverages in these embodiments.

A further feature of the present invention is an automated time and/or dispensing interval related, self-cleaning system for flushing out all components that are exposed to milk flow. This is accomplished by positioning a flush control valve and a three-way valve, acting as a diversion valve, in the air supply line that leads to the air inlet of the emulsification unit. After each dispensation of a quantity of milk through the emulsification unit, the flush control valve and the pump are actuated and the diversion valve is positioned such that it allows a flow of flushing water through the air supply line, and through the emulsification chamber, to rinse out any residual milk that may have seeped into the air supply line, and also to rinse out the emulsification chamber itself. The only other connection to the emulsification chamber is from the steam boiler, which discharges steam with each actuation. A small quantity of steam may also be vented through the emulsification chamber following the dispensation of each portion of a dairy-based beverage. Consequently, all the components of the emulsification system that are in contact with the dairy-based liquids can be flushed or purged following each use of the machine for dispensing a dairy-based beverage. By providing this self-cleaning feature, the system of the invention avoids the chore of requiring cleaning of the unit between beverage dispense cycles and throughout the normal daily course of business.

A further feature of the present invention is the minimization of nondisposable components that are exposed to the flow of milk. The emulsification chamber and its milk inlet and nozzle seating inlet cavities are supplied as one disposable unit that is discarded each day following use. The nozzles themselves are reusable, but are very easy to clean. Thus, the beverage dispenser of the present invention to a very large extent eliminates the cleaning requirement that is required with conventional units of this type.

Still another feature of the invention is the provision of a system that allows for different steam temperatures and velocities on demand. For example, depending on the desired dispensing speed and flow rate in the preparation of a frothed mixture of milk and air for cappuccino, a steam temperature of 125° C. may be appropriate. On the other hand, when preparing hot nonfoamy milk for a coffee latte, a higher steam temperature of possibly 140° C. may be required. This is caused by the fact that the absolute mass of milk relative to the dispensed volume is higher when dispensing hot nonfoamy milk versus hot foamy milk. More energy per volumetric unit dispensed therefore has to be added when preparing hot, nonfoamy milk, thus requiring the steam being injected to be of a higher temperature. Conventional systems do not employ a means for making an immediate temperature change in the steam from a single steam source. In the present invention, on the other hand, a signal indicating that hot nonfoamy milk is the desired beverage to be dispensed initiates a software-driven process in which an algorithm programmed into a microchip immediately increases the steam temperature in the steam source, which is typically a boiler, from a programmable, standby base temperature to a programmable higher temperature which is the required temperature for emulsifying milk and steam. The steam at a higher temperature is supplied to the steam inlet and causes the nonfoamy milk to be dispensed at the desired temperature. By the same token, when a selection of foamy milk for cappuccino as the desired beverage to be dispensed is chosen, the software-driven process immediately decreases the steam temperature in the boiler from a programmable, standby base temperature to a lower, programmable temperature which is the required temperature for emulsifying milk, air, and steam. The steam at a lower temperature is supplied to the steam inlet and causes the foamy milk to be dispensed at the desired temperature. The software in effect allows for the supply of steam at multiple target temperatures. The base or standby temperature of the steam in the unit may, for example, be about 135° C.

In addition to the fact that the invention comprises software that enables a constant supply of steam at multiple target temperatures, the software also enables the boiler system to maintain these multiple, different, programmable temperatures within a very narrow bandwidth of +2° C. or −2° C. This is accomplished by means of an algorithm. The software keeps track not only of the actual steam temperature inside the boiler, but also of the rate at which the steam temperature increases or decreases while heating up or cooling down. This allows the software to anticipate when a programmed target temperature will be reached. The quantification of this anticipation is used to turn the heating element(s) inside the steam boiler on or off in advance of reaching the target temperature. The result is that the fluctuations of the actual temperature around the target temperatures are reduced significantly. The temperature inside the boiler is maintained within a narrow bandwidth which results in the supply of steam at stable temperatures.

Temperature control in the boiler can be achieved by using a temperature control algorithm which is a simple on/off thermostat style temperature control that turns the heat on when the temperature is more than 1° C. below the desired temperature and off when the temperature is more than 1° C. over the desired temperature. One problem that can occur with this arrangement is that the delay between heat application or removal and the resulting temperature change may cause the temperature to overshoot and undershoot by unacceptable amounts. For example, when heat is removed, the temperature in the boiler begins to fall quite rapidly, approximately 0.6° C. per second. When the temperature reaches 1° C. below the desired temperature, the heat will be turned on. It may take several seconds for the temperature to begin to rise. During this time the temperature continues to fall several more degrees, which can cause an unacceptable undershoot in temperature. When the temperature rises, the heat build up during heating may cause a similar unacceptable overshoot in temperature.

One solution to such a problem, if it occurs, is to add a derivative term to the temperature control algorithm. This term is based on the rate of temperature change. Basically, a temperature rate of change term, or "delta-T" is constantly calculated. When the current temperature is within a predetermined range of the desired temperature (approximately ±3° C. in this case) the delta-T value is compared to a predetermined value. If the heat is on and the delta-T is over the value, the heat is turned off regardless of whether the current temperature is above or below the desired temperature. If the heat is off and the −(delta-T) is over the value, the heat is turned on regardless of whether or not the temperature is above the desired value. This type of "predictive" temperature control can be equated to applying the brakes in an automobile before arriving at a stop sign.

The transition from the base temperature to a higher temperature happens in the following manner. A printed circuit board reads the difference between the actual steam temperature inside the boiler and the desired higher temperature and activates a relay that allows a current to flow to the heating element(s) inside the boiler which increases the temperature, and thereby the pressure in the boiler, to the desired target temperature. This process is controlled by an algorithm (software, see above) programmed on the microchip of the printed circuit board, which also controls the actual temperature to remain with a certain bandwidth, as described above, of the desired higher temperature.

In case the desired temperature is lower than the standby temperature, the software allows steam to escape from the boiler and thereby lowers the actual steam temperature in the boiler so that it reaches the desired lower target temperature. The heating element does not receive any current until required to maintain the desired lower target temperature. The same microchip controls the actual temperature to remain with a certain bandwidth around the desired lower target temperature.

In one broad aspect the present invention may be considered to be an improvement in a device that includes a venturi-based emulsification unit for emulsifying dairy-based liquids with other fluids and dispensing an emulsified mixture of those fluids into a beverage container for consumption. The improvement is comprised of a housing containing a refrigerated upper compartment with a chilled storage container of a dairy-based liquid therein coupled to the emulsification unit, which is located therebeneath. The invention also includes an electrically operated dairy liquid flow control valve located between the upper compartment and the emulsification unit. Activation of the electrically operated dairy liquid flow control valve allows gravitational flow of the dairy-based liquid to the emulsification unit.

The dairy liquid flow control valve is used in two positions, 1) the OFF (no activation of the magnetic coil) position which completely blocks the flow of the dairy-based liquids from the chilled storage container to the venturi-based emulsifier, and 2) the ON position (activation of the magnetic coil). The ON position allows for an uninterrupted gravitational flow of the dairy-based liquids from the chilled storage container to the venturi-based emulsifier. As previously indicated, this aspect of the invention is particularly useful with "bag in box" milk storage containers.

In another broad aspect the invention may be considered to be an emulsification device for dispensing hot, dairy-based beverages comprising: a housing having upper and lower portions and a flow channel therebetween; a refrigerator located in the upper portion of the housing with a storage container located therein containing a chilled, dairy-based liquid; an emulsification device defining an emulsification chamber therewithin located beneath the level of the upper portion of the housing and including fluid inlets thereto and a dispensing outlet therefrom; an electrically operated, normally closed pinch valve located in the flow channel of the housing, a flexible conduit leading from the storage container to the emulsification device and passing through the pinch valve; a pressurized fluid reservoir contained in the lower portion of the housing and coupled to the emulsification device; and an electrically operated control for selectively admitting fluid under pressure from the fluid reservoir to the emulsification device while opening the pinch valve to concurrently allow the dairy-based liquid to flow in response to gravitational force into the emulsification chamber. In this manner the pressure from the fluid reservoir propels fluids through the emulsification chamber to the dispensing outlet. These other fluids that are added to the dairy-based liquid typically include steam, and for some dairy-based beverages, air as well.

In still another broad aspect the invention may be considered to be an improvement in a device for emulsifying dairy-based liquids with selected other fluids including steam and air in order to dispense a heated fluid mixture including a dairy-based beverage. The improvement of the invention is comprised of a thermostatic sensor and one or more heating elements for selectively mixing steam at alternative temperatures with the dairy-based liquid. In this way the selection of a particular input, such as a push button associated with a particular beverage, for example cappuccino or coffee latte, generates an actuating signal that is sensed by an electrical processor as identifying the particular beverage selected. This actuating signal causes the temperature controller to increase or decrease current to the boiler heating element, as required, to cause the output steam of the boiler to be at an increased or decreased temperature relative to the standby temperature of steam in the boiler and to maintain it at the increased or decreased temperature as long as demanded by continued activation of said actuating signal. The software employed allows the system to reach different, programmable target steam temperatures and maintain these temperatures within a narrow bandwidth.

An aspect of some embodiments of the invention may be considered to be an improvement in a device for emulsifying dairy-based beverages with selected other fluids, including air, and dispensing an emulsified mixture of selected fluids including a dairy-based beverage from an emulsifier. According to the improvement of this aspect of the invention, a source of air above atmospheric pressure is connected to the emulsifier. The system therefore does not rely solely upon suction created by the venturi effect of the emulsifier to supply air for the beverage mix. The use of pressurized air may improve the consistency of the temperature and the proportions of fluids in the beverage mixture as the beverage is discharged from the emulsifying unit.

In still another aspect the invention may be considered to be an improvement in an apparatus for emulsifying dairy-based liquids with other fluids including an emulsification chamber having a beverage dispensing outlet located downstream from the mixing chamber for dispensing portions of the dairy-based beverage and at least one of the other fluids. The improvement of the invention is comprised of a supply of water under pressure coupled to the emulsification chamber. A flush control valve and a three-way valve are located between the supply of the water and the emulsification chamber. A flush control valve actuator can be programmed to automatically open the flush control valve to dispense a quantity of water from the supply of water through the emulsification chamber following dispensation of each portion of beverage. Alternatively, it can be programmed to provide a smaller quantity of water that travels only up to the emulsification chamber before the dispensation of a beverage if the purpose is to keep out unwanted air. One of the other fluids dispensed is air and there is an air line coupled to the emulsification chamber. The three-way valve is coupled to the air line and to the supply of water and is operable to alternatively supply water and air through the air line to the emulsification chamber.

In still another broad aspect, the invention may be considered to be an improved method for emulsifying dairy-based liquids with other fluids by passing the dairy-based liquids with at least one other fluid through a fluid emulsification chamber to a beverage dispensing outlet in selected portions. The improved method comprises selectively and alternatively supplying air through an air supply line for mixing with dairy-based beverages and automatically flushing water through the air supply line to the emulsification chamber to the beverage dispensing outlet before or after dispensation of each of the portions.

The invention may be described with greater clarity and particularity by reference to the accompanying drawings.

DESCRIPTION OF THE EMBODIMENT

Figure 1:
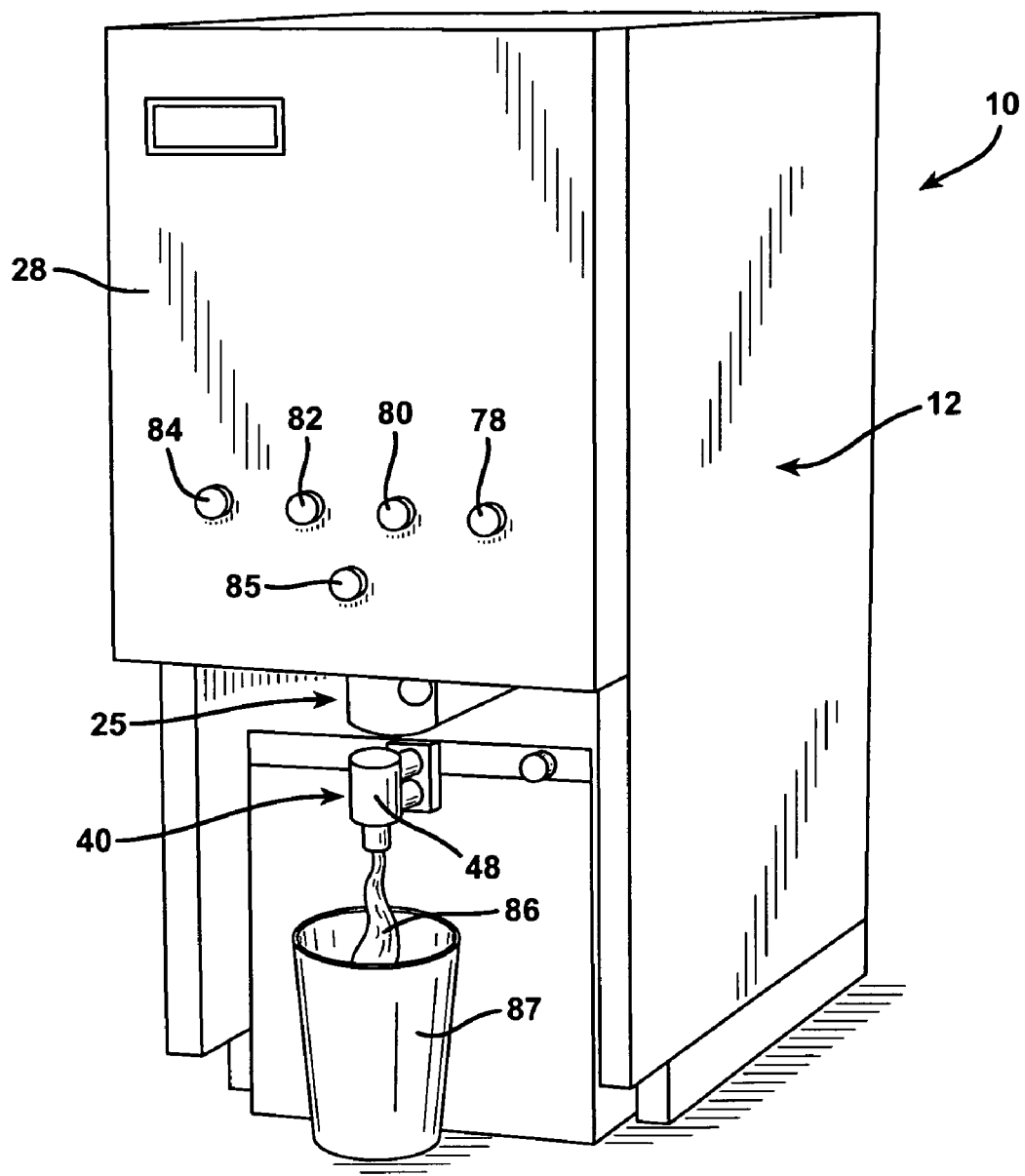
FIG. 1 is a perspective view of a preferred embodiment of a device for emulsifying dairy-based liquids with other fluids and dispensing this mixture as a hot beverage at a desired temperature.
Figure 2:
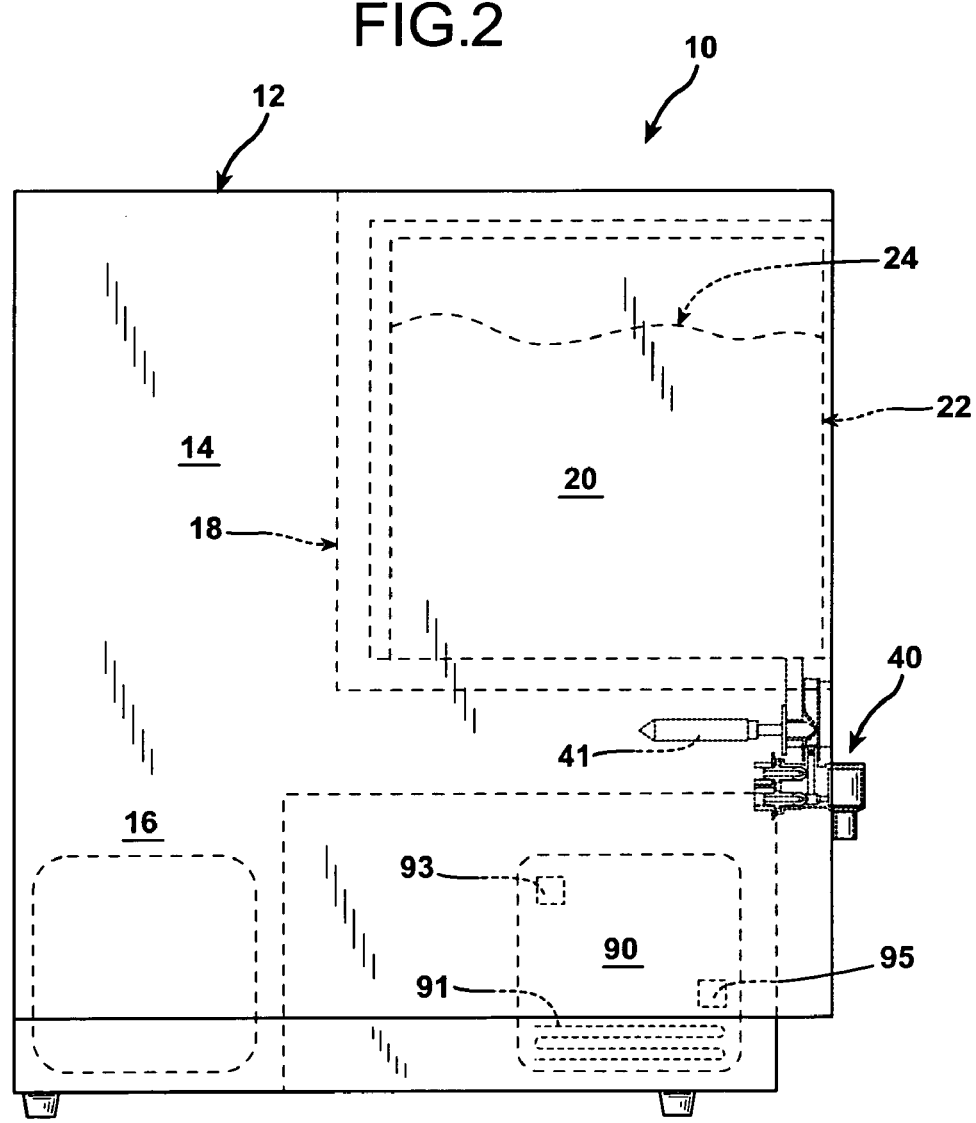
FIG. 2 is a side sectional view of the emulsification and dispensing unit shown in FIG. 1.

FIG. 1 illustrates an emulsification and dispensing device 10 that employs a cabinet 12 having an upper portion indicated generally at 14 in FIG. 2, and a lower portion indicated generally at 16 in that drawing figure. The upper portion 14 includes an electrically operated refrigerator 18 having cooling coils that keep the cooling cavity thereof at a temperature of preferably between about 32° F. and 40° F. The cooling cavity of the refrigerator 18 can accommodate a disposable "bag in box" milk container 22, or any other containing device such as a regular/standard one gallon or one-half gallon plastic container or carton that holds a supply of milk 20 in the upper portion 14 of the cabinet 12. Specifically, the container 22 is formed of a corrugated paperboard outer, rectangular box within which a flexible, collapsible plastic bag 24 is located. The bag 24 is equipped with a discharge hose 26, best illustrated in FIG. 3, which is formed of a short length of rubber tubing. The hose 26 has a proximal end sealed in flow communication with the bottom of the bag 24, and a opposing, free, distal end that is initially sealed shut at its extremity.

To utilize the "bag in box" container 22, the door 28 of the refrigerator 18 in the upper portion 14 of the unit 10 is opened and the corrugated paperboard container 22 is positioned therein with the flow discharge hose 26 directed downwardly through a small opening located in the floor of the refrigerator cavity near the front of the unit, just behind the refrigerator door 28. The hose 26 is inserted downwardly through the opening in the refrigerator floor and past a pinch door 30 that is hinged for rotation about a vertical axis and latched against the structure of the housing 12. The pinch door 30 has a vertical, semi-cylindrical channel 32 defined in its inner surface that resides in face-to-face contact with a corresponding vertical, semi-cylindrical channel 34 defined in a backing structure 36 located behind the pinch door 30. The channels 32 and 34 thereby form a vertical, cylindrical passageway down from the opening in the floor of the refrigerator 18. This passageway is in communication with the upwardly directed, hollow, annular milk inlet pipe 42 in an emulsification or foaming head unit 40.

Figure 3:
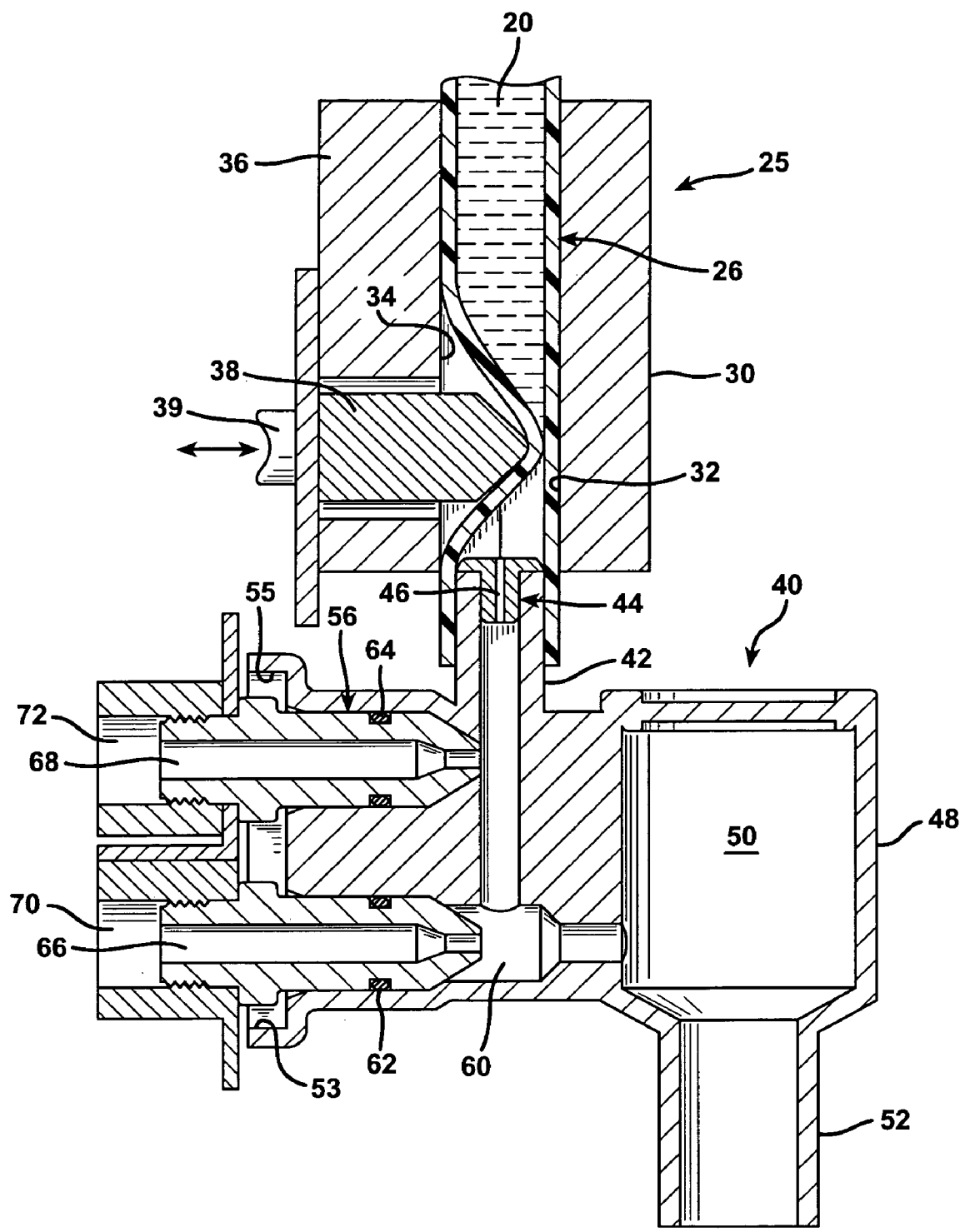
FIG. 3 is a side sectional view of parts of the emulsification and dispensing device illustrated in FIG. 2.

When the pinch door 30 is closed against the backing block 36 and latched relative thereto, the milk discharge hose 26 is pressed against a normally closed pinch valve 25 that includes a reciprocally removable valve gate 38 that is mounted at the end of a solenoid actuated armature 39. In its deactivated condition, the solenoid actuated armature 39 presses the pinch valve gate 38 forwardly in a horizontal direction perpendicular to the pinch door 30 and perpendicular to the alignment of the refrigerator door 28. The pinch valve gate 38 thereby normally pinches the discharge hose 26 shut, as illustrated in FIG. 3.

Once the door 28 has been closed and the pinch door 30 is pressed against the backing structure 36 and secured with a screw or latch; the milk discharge hose 26 is sealed off and will not let milk flow beneath the valve gate 38. The lower extremity of the distal tip of the milk discharge hose 26 is then cut off, and the severed distal end is then pushed coaxially onto the vertically oriented milk inlet pipe 42 of the emulsifier unit 40, as illustrated in FIG. 3.

Because the diameter of the milk discharge hose 26 from the "bag in box" unit 22 is considerably larger than required to supply milk to the emulsifier 40. A constrictive throttling flow restrictor 44 is preferably inserted into the milk inlet pipe 42. The restrictive throttling flow restrictor 44 is an annular structure, having a flanged top that seats upon the transverse, annular upper edge of the dairy-based liquid inlet pipe 42. A narrow, central orifice or duct 46 extends the length of the throttling flow restrictor 44 at its axial center. The duct 46 preferably has a diameter ranging from 0.046 inches to 0.055 inches, depending upon the volume of beverages to be dispensed from the emulsifier 40.

The refrigeration chamber 18 of the emulsifier and dispenser 10 is located above the emulsifier/venturi unit 40. This means that the lowest possible level of milk 20 in the bag 24 is always higher than the level of the emulsifier 40. As a consequence, the force of gravity will always act upon the remaining supply of milk 20 to carry it to the emulsifier 40. Also, no mechanical pump is required to supply the milk 20 to the emulsification unit 40.

The use of a system partially fed by gravity for the dairy-based liquid has the further advantage of an immediate response to actuation of the system. Because the dairy-based liquid is always located immediately above the pinch valve 25, there is no delay in drawing milk through some supply line from a remote source, and no delay while air is sucked out of the milk supply line before milk can be drawn into it. To the contrary, the milk 20 is always immediately available for dispensation into the emulsifier unit 40.

The emulsifier 40 is constructed of a molded, plastic body 48 that defines a hollow, cylindrical emulsifying chamber 50 within its structure. In many respects the emulsifier 40 is constructed to operate like the emulsifier unit described in U.S. Pat. No. 4,715,274, which is hereby incorporated herein by reference in its entirety. A milk-based beverage discharge duct 52 projects downwardly from the mixing or emulsifying chamber 50.

The emulsifier housing 48 also defines a pair of laterally oriented cavities 53 and 55, located one above the other to respectively receive a steam nozzle 54 and an air nozzle 56. The nozzles 54 and 56 are inserted into the corresponding cavities 53 or 55 in the body 48 and are in flow communication with a venturi chamber 60 oriented at right angles to and intersecting the vertical milk inlet pipe 42. O-rings 62 and 64 are respectively located in corresponding annular, channel-shaped recesses in the nozzle cavities 53 and 55 about the nozzles 54 and 56 to ensure fluid-tight seals about the outer perimeters of the nozzles 54 and 56 with the emulsifier unit 40. The nozzles 54 and 56, respectively define within their structures central, axial flow channels 66 and 68 which are respectively coupled to a steam supply line 70 and a pressurized air supply line 72, indicated in FIG. 4. In the preferred embodiment of the invention, the orifice of the steam nozzle 54 as it enters the mixing cavity is preferably 0.086 inches, but may vary as well.

Figure 4:
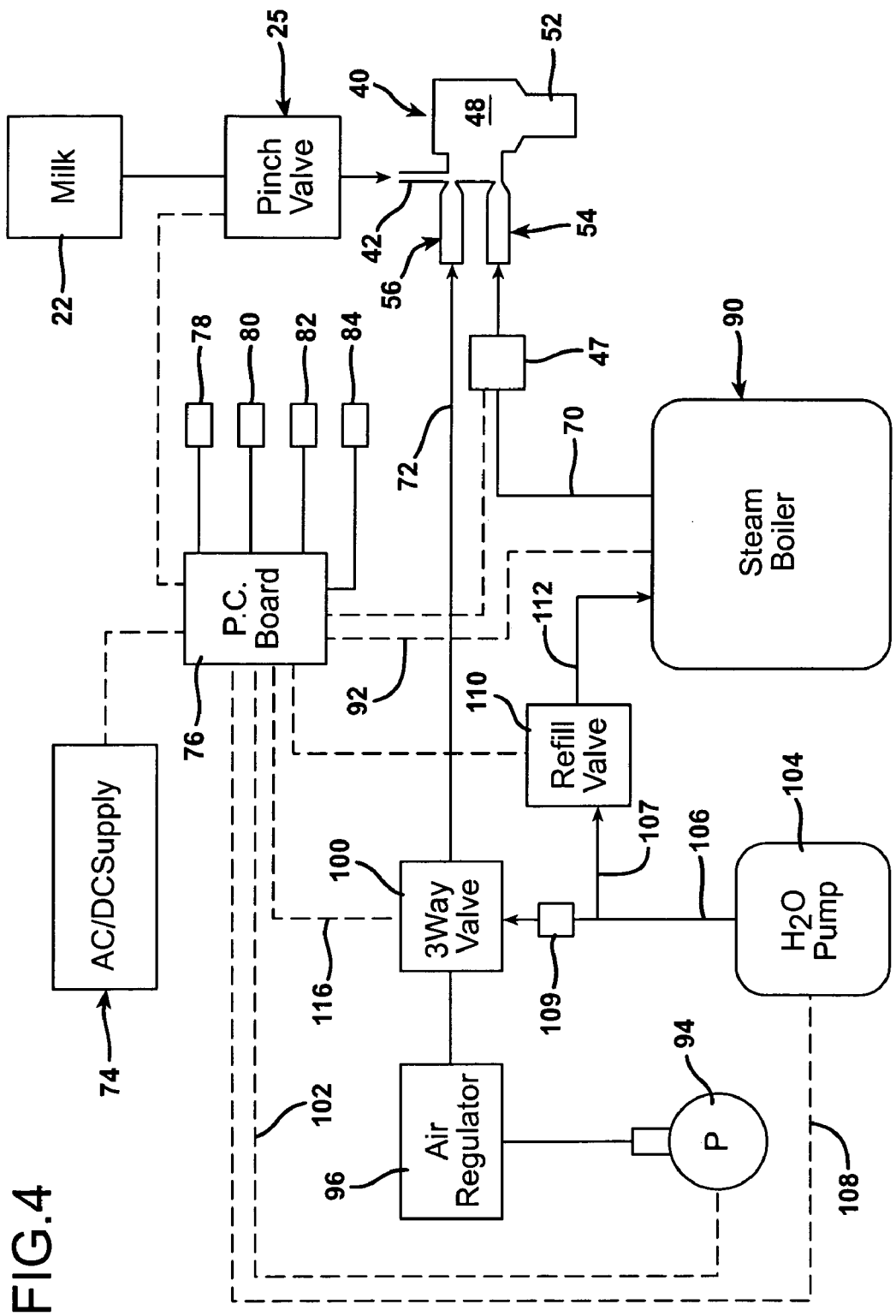
FIG. 4 is a schematic diagram illustrating the operative components of the emulsifying and dispensing device of the invention.

The system is operated by an AC/DC electrical power supply 74 indicated in the schematic diagram of FIG. 4, which provides operating power to a printed circuit control board 76. In the preferred embodiment of the emulsifying and dispensing device 10 illustrated, there are four actuating buttons indicated at 78, 80, 82, and 84. Of course, depending on the application, the number of actuating buttons may be more or less. These actuating buttons are depressed to produce a flow of a hot, dairy-based beverage indicated at 86 in FIG. 1. A fifth actuating button 85 is provided to allow a user to actuate the system to emit a purging flow of water and steam, as will hereinafter be described.

The parameters for each button are programmable and flexible. Any button can be programmed to generate hot foamy milk or hot nonfoamy milk. Furthermore, each button can be programmed to function when depressed and held or for an appropriate time. In time controlled applications, the button is actuated by depressing it once and it will stop functioning when it is depressed again or when the programmed time period to has expired.

For example, the button 78, when depressed and held, can be programmed to produce a flow of a mixture of compressed air, steam, and milk that is emulsified in the emulsifier unit 40 and dispensed in a flow 86, as illustrated in FIG. 1. The flow 86 continues for as along as the button 78 is held depressed.

Like the button 78, the button 80 can be utilized to dispense a cappuccino dairy-based beverage mix of frothed milk aerated with compressed air and heated by steam. However, the button 80 provides a signal to the printed circuit board 76 that produces preset specified quantities of fluids in the flow 86 regardless of how long it is pressed. That is, momentary depression of the button 80 produces a predetermined, aliquot portion of flow 86 to the container 87, unless it is interrupted (by momentary depression) before this portion has been dispensed.

The button 82 may be utilized to initiate a signal to the printed circuit board 76 that produces a flow of hot nonfoamy milk for coffee latte, as long as depression of the button 82 continues. In the preparation of hot nonfoamy milk there is no supply of air to the air nozzle 56. The flow of milk 86 heated by emulsification with steam to the container 87 continues for as long as the button 82 is depressed. In another option, the button 84 may be momentarily depressed to produce a flow 86 of a preset aliquot portion of heated milk for coffee latte. That is, even momentary depression of the button 84 produces a flow of a predetermined amount of heated milk to the container 87.

As illustrated in FIGS. 2 and 4, the emulsifying and dispensing unit 10 contains a steam boiler 90 in its lower section. The steam boiler 90 may be one liter in volume and is equipped with a heating element 91, which may be a six kilowatt electrical heating coil. A sensor element 93 of a thermostat control is also located within the boiler 90. The boiler 90 is connected to the steam nozzle 54 by a steam supply line 70. The operation of the steam boiler is controlled through an electrical control line 92 by programmable settings in the printed circuit board 76.

The emulsifying and dispensing unit 10 also includes an optional air pump 94 that is connected to an air regulator 96, which is a needle valve. The air regulator 96 in turn is coupled by an air duct 98 to a three-way valve 100. The three-way valve 100 is connected by the air supply line 72 to the air nozzle 56. Operation of the air pump 94 to achieve a desired pressure is under the control of an electrical signal control line 102 from the printed circuit board 76. The printed circuit board 76 controls the condition and direction of operation of the three-way valve 100 by signals on line 116.

The unit 10 also includes a water pump 104 which is also connected by a water conduit 106 to the three-way valve 100. Operation of the water pump 104 is controlled by an electrical control line 108 from the printed circuit board 76. Also, there is a branch tube 107 from the water conduit 106 leading to a refill valve 110, that in turn is connected by a conduit 112 to the steam boiler 90. The refill valve 110 is controlled from the printed circuit board 76 by an electrical control line 114.

A level sensor 95 in the steam boiler 90 monitors the level of water remaining in the boiler 90. This water level is checked by level monitoring circuitry on the printed circuit board 76. When the level of water in the boiler 90 drops below a minimum level, the circuitry in the printed circuit board 76 opens the refill valve 110 by a signal on line 114. The water pump 104 then pumps water through the lines 106 and 107, and through the refill valve 110 and conduit 112, to replenish the water supply in the steam boiler 90.

The operation of the hot, dairy-based beverage dispenser 10 may be described as follows. A quantity of milk 20 is stored in the "bag in box" container 22. It is to be understood that any other type of milk container such as a one gallon or a half gallon milk pack could be employed in place of the "bag in box" container 22. The container 22 is maintained in a refrigerated state at between 32° F. and 40° F. by the refrigeration unit 18. It should be noted that the milk is stored within the bag 20 in cold storage above the level of the venturi-based emulsifier unit 40.

When one of the demand buttons 78, 80, 82, or 84 is actuated, the preset programming of the printed circuit board 76 actuates the electrical solenoid 41, indicated in FIG. 2, to pull the solenoid armature 39 inwardly, and thereby pull the pinch valve gate 38 away from clamping contact against the milk supply hose 26. Depending upon which of the buttons 78, 80, 82, and 84 is actuated, the solenoid 41 will maintain the valve gate 38 in a withdrawn condition either until the button is released, or for a predetermined time interval as determined by the settings of the printed circuit board 76, or otherwise when the button is momentarily depressed before the predetermined time interval has elapsed.

In any event, when actuation of the solenoid 41 withdraws the valve gate 38 from clamping engagement against the milk supply hose 26, the milk 20 thereupon descends under the force of gravity down to the dairy-based liquid inlet pipe 42. Milk 20 thereupon drains down from the bag 24, through the milk discharge hose 22, to the milk inlet pipe 42, and on to the emulsification unit 40. The throttling flow restrictor 44 limits the flow of milk 20, depending upon the size of its orifice.

Concurrently with the actuation of milk flow to the inlet 42 of the emulsification unit 40, the circuitry of the programmed printed circuit board 76 sends a signal over the control line 92 to actuate the steam boiler 90 to produce steam at a desired temperature. The steam boiler 90 is normally maintained in a steady state or standby condition at a temperature ranging from 130° C. to 135° C. If the button 78 or 80 is depressed, thereby calling for the preparation and discharge of frothed, heated milk for cappuccino, this temperature is reduced by delaying the heating current to the electrical heating coil 91 located in the steam boiler 90. The response is nearly instantaneous. The temperature drops very rapidly to the new target temperature of 125° C., for example, and the steam pressure drops as well to a pressure of about twenty-two psi above ambient pressure. Steam is thereupon immediately discharged from the steam boiler 90 at a temperature of about 125° C. and a pressure of between fifteen and twenty-two psi.

Concurrently, and as an option, the printed circuit board 76 through control signal line 102 operates the air pump 94 to produce air at a pressure of about five to ten psi over atmospheric pressure and also operates the three-way valve 100 by control signals on line 116 to the position to couple line 98 to line 72. The air regulator 96 is thereupon coupled by line 98 to direct air through the three-way valve 100 and line 72 to the air nozzle 56.

In the preparation of hot foamy milk, for example for use in the preparation of cappuccino, depression of the appropriate button 78 or 82 conditions the printed circuit board to start the flow of milk to the emulsifier 40 by actuation of the solenoid 41, and the flow of both air and steam to the emulsifier 40 by an actuating signal to the heating element 91 of the steam boiler 90 through line 92, by operation of the three-way valve 100 by signals on the control line 116 to connect lines 72 and 98 together, and by actuation of the optional air pump 94 through a signal on control line 102. The three fluids are thereby admitted, all under pressure, to the emulsification chamber 50. The pressure on the flow of milk 20 is partially by gravitational force, while the pressure on the air is supplied by either suctional force created by the venturi-based foamer or by the pump 94. The steam pressure is supplied by the steam in the steam boiler 90. The flow of steam is controlled by steam valve 47 which is located in line 70 and which is operated to either a fully open or fully closed position.

The steam heats the milk and air within the emulsification chamber 50, and condenses to a relatively small volume of water. The beverage 86 that is dispensed into the beverage container 87 for use in cappuccino is therefore about two-thirds milk and about one-third air in volume, depending upon the air regulator setting. However, a significant portion of the milk is entrained in foam that resides atop the beverage in the container 87. In actuality, the beverage 86 is comprised of about fifty percent heated milk and about fifty percent foam formed of bubbles of milk residing in a layer atop the beverage in the receptacle 87, as measured by volume.

The preferred temperature of the cappuccino beverage mixture 86 as it leaves the emulsification chamber 50 through the outlet 52 ranges between 155° F. and 165° F. Depending on the steam pressure, i.e., steam temperature, it takes approximately thirty seconds to fill a sixteen-ounce beverage container 87 with heated milk and foam for use in a cappuccino beverage.

To prepare hot nonfoamy milk, for example for a coffee latte, either the button 82 or the button 84 is depressed. At this time the printed circuit board 76 is conditioned so that the three-way valve 100 blocks the air supply from the pump 94 entirely. The programmed circuitry of the printed circuit board 76 also transmits a signal on line 92 to the steam boiler 90 to actuate the heating coil 91 in the steam boiler 90 to raise the temperature of the steam to a new target of about 140° C., which increases the pressure within the boiler 90. Typically, in the preparation of hot nonfoamy milk, the steam pressure in the boiler 90 is at about thirty-nine psi.

The pinch valve 25 is also actuated concurrently upon depression of the hot nonfoamy milk button 82 or 84, so that milk 20 flows past the pinch valve 25 and is mixed with steam injected through the nozzle 54. The two fluids are mixed in the emulsification chamber 50 and dispensed through the emulsifier beverage discharge duct 52.

The fluid that leaves the emulsification chamber 50 in the preparation of hot nonfoamy milk is almost entirely milk, since the steam that heats the milk is condensed to a rather small volume of water. The temperature of the heated milk in the flow 86 for hot nonfoamy milk as it leaves the discharge duct 52 should also range between 155° F. and 165° F. Depending on the temperature in the steam boiler, it takes about thirty seconds to dispense a sufficient amount of heated milk 86 for coffee latte into a sixteen ounce beverage container 87.

A very important aspect of the invention is the feature of self-cleaning. Irrespective of which of the buttons 78, 80, 82, or 84 is depressed, the air nozzle 56 and the line 72 leading to the air nozzle 56 are flushed out following the dispensation of a portion of the heated dairy-based beverage 86. This step of self-cleaning occurs in the following manner. Following cessation of milk, steam, and airflow, if any, either by reason of the timing out of the actuating signal initiated by the buttons 78 or 82, or by reason of release of the buttons 80 or 84 by a user, the program of the printed circuit board 76 initiates a cleaning cycle. Specifically, the circuitry on the printed circuit board 76, through signals on line 116, positions the three-way valve 100 to couple the water conduit 106 to the air supply line 72 and block any flow back through line 98. The water pump 104 thereupon supplies a quantity of flushing or purging water that travels from water conduit 106, through the flush control valve 109 and the three-way valve 100, through air supply line 72 to the air nozzle 56, and into the emulsification chamber 50. It requires only a small quantity of water to flush out the lines 106 and 72, the three-way valve 100, and the nozzle 56, since there is a relatively small volume within these components. The flushing water is dispensed through the air nozzle 56 for a predetermined, programmable time, perhaps two seconds. At the same time, a signal on control line 92 to the steam boiler 90 initiates the discharge of a small quantity of purging steam to clear the steam supply line 70 and steam nozzle 56 of any milk and water that may remain in those components.

By employing a flushing or purging cycle following each dispensation of a beverage 86, the system avoids any contamination by milk that may have worked back into the air nozzle 56 or the air line 72, the steam nozzle 74, or the steam line 70. As a consequence, it is possible to flush all traces of milk out of the air and steam lines and nozzles by using water from the water pump 104 and the steam from the boiler 90. The quantity of flushing water, with relatively small traces of milk or possibly other impurities therein, is simply dispensed from the discharge duct 52 into a waste basin.

It should be noted that apart from the "bag in box" container 22, the outlet hose 26 therefrom, the nozzles 54 and 56, and the emulsification unit 40, no part or mechanical component of the dispensation unit 10 comes in direct contact with the milk 20. This allows for daily, extremely cost efficient, and simple cleanup operations. More specifically, the emulsification unit 40 is a very cheap, disposable item that is discarded on a daily basis. Likewise, the "bag in box" container 22 for the milk 20 is a disposable item as well. The milk 20 remains stored in the refrigeration unit 18 until it is used up, or until it is past its expiration date. When this occurs, the "bag in box" container 22, together with the discharge hose 26 emanating therefrom, are also thrown away.

The steam and air ejector nozzles 54 and 56 are the only parts of the unit that come into contact with the milk that are not designed for daily throwaway. The inside channels of the ejectors 54 and 56 are flushed automatically with water and steam after each programmed quantity of a beverage has been dispensed. The timing of the flushing cycle is controlled by the printed circuit board 76, which is programmable and software controlled. Also, the nozzles 54 and 56 are very easy to clean, wipe off, and/or brush from the outside.

The selector button 85 may be utilized to perform a water and steam flushing or purging cycle at any time an operator of the emulsification and dispensing unit desires. Depression of the selector button 85 provides a means for manually initiating the same flushing and purging cycle that is programmed to occur automatically after each beverage portion is dispensed.

While the dispensing unit 10 has particular applicability to the "bag in box" container 22, previously described, it may also be utilized in connection with commercially available gallon packs, gallon bottles, or other commercially available dairy product packaging in which the milk dispensing hose is connected through an opening in the top of the container. In such an arrangement the hose enters the container from the top, but projects downwardly to the bottom of the milk container. With such a hose connection, an initial suction or siphoning force is necessary to draw the milk up from the bottom of the container through the opening in the top, and down through the supply hose that would be inserted through the pinch valve 25 onto the milk inlet pipe 42. Thereafter, however, the siphoning effect created would aid the milk in reaching the emulsification unit 40. Unlike conventional systems, no siphon break is required, since the entire milk container and its associated hose structure is housed within the refrigeration unit 18.

The pinch valve 25 is an important component of the dispenser 10. The use of such a pinch valve in a hot dairy dispensation application is unique to the present invention. The pinch valve 25 is located directly above the emulsification unit 40. The pinch valve 25 allows an automatic purge and rinse cycle of the foamer head unit or emulsification unit 40 since no part of the pinch valve 25 makes contact with the milk 10.

A further advantage of utilizing a pinch valve 25 is that it prevents milk from flowing back into the cold storage container 22 so that the next beverage dispensing cycle can be started without delay and with the aid of gravity feed, as with the "bag in box" container 22. Since no siphon break is necessary, the supply tubing is always completely filled with milk. As a consequence, no delay is experienced and no inconsistency in dispensation occurs when the dispensing device 10 is actuated to dispense the next beverage. This feature is extremely important for true self-service applications, where dispensation into the container 87 must occur immediately following depression of one of the beverage buttons 78, 80, 82, or 84 by the customer. With even a momentary delay, some customers will replace or remove the container 87, thus risking exposure of the skin of their hand to hot beverages.

The use of the pinch valve 25 against the tube 26, in combination with a venturi-based foamer head emulsifier unit 40 is also unique in that it prevents direct contact between the milk 20 and the operating components of the pinch valve 25. As a consequence, the pinch valve 25 itself does not have to be removed or cleaned on a daily basis. The removal and cleaning of a mechanical valve is generally too complicated for the end user or operator of the machine 10. Rather, it would require the aid of a qualified technician. However, with the construction of the present invention, removal and/or cleaning of the pinch valve 25 would only become necessary in the case of a valve malfunction, which is an unlikely occurrence.

In contrast, conventional, mechanical valves that interrupt milk flow generally remain in a machine until a technician replaces them. Such valves require a rigorous daily flushing procedure, with special chemicals. If such valves are not cleaned properly, they suffer from bacteria buildup and unreliable performance. However, the use of the pinch valve 25 that avoids direct contact of any operating component of the flow control mechanism with the milk 20 eliminates the requirement for such cleaning.

The present invention utilizes steam from a single boiler 90, which is injected at different, distinct temperatures, pressures, and velocities as determined by the beverage buttons 78, 80, 82, and 84 that are depressed. While the steam could be injected through two different nozzles, depending upon the beverage selected, it preferably is supplied through the single steam nozzle 54. It is to be understood, however, that separate steam nozzles 54 could be provided to the foamer head 40 if desired. The orifice of each steam nozzle could be different and particularly suited for the beverage for which it is utilized.

The emulsification and dispensation unit 10 provides totally controlled temperature consistency in the beverage product that is dispensed. The steam originates from a single boiler 90 and is injected at different, distinct temperatures, pressures, and/or velocities. The path of steam flow is preferably through a single inlet steam injector 54 to a single foamer head 40. Temperature control occurs upon demand, that is, upon the depression of a selected one of the buttons 78, 80, 82, or 84. Availability upon demand of steam at the selected, button-related temperature is crucial. Unlike conventional systems, the present invention does not involve resetting or recalibrating the boiler 90 to a new base steam temperature for each change in the beverage selected. To the contrary, the programmable base (stand by) steam temperature remains the same regardless of the beverage selected. Once the beverage is selected, the steam in the boiler 90 is rapidly heated or cooled as required due to the relatively powerful heating element 91 and the relatively small volume of the boiler 90. The base steam temperature lies between the highest and lowest steam temperatures required for the heated, dairy-based emulsified beverages produced. It is possible to use a relatively small boiler 90 due to the provision of the refill valve 110 to replenish the water supply from the water pump 104, as required and indicated by the level sensor.

The precision in temperature control achieved with the emulsification and dispensing unit 10 of the present invention is extremely important. If the temperature of the dispensed dairy-based beverage rises above 170° F., the milk protein starts to caramelize, resulting in burnt or scalded milk. The industry standards specify that temperature of the dispensed beverage 87 should not exceed 165° F. The tight temperature control is achieved by switching the power supplied to the heating coil 91 in the steam boiler 90.

The use of an actively pressurized air source for supplying air under pressure to the air nozzle 56 can also be advantageous. Unlike conventional venturi-based emulsifier head systems, the present invention does not necessarily rely solely upon a pressure differential created "passively" through suction in the venturi foamer. Such systems may produce inconsistent beverage mixes due to variations in atmospheric pressure. The positive elevated pressure above ambient atmosphere created by the system of the present invention provides a more stable, more consistent and even air flow through the air nozzle 56.

The optional provision of air under pressure may also improve the consistency of the temperature of the beverage 87 as it is dispensed because the proportion of milk to air is more consistent. In conventional systems that are subject to variations in venturi suction, a drop in air flow due to a lower ambient pressure results in a greater amount of milk in the mixture. Conversely, a rise in ambient air pressure will increase the volume of air in a conventional venturi foaming heat, thus lowering the mass of the milk in the combined mixture. The greater amount of air in the mixture, the less milk there is to be heated.

The active preprogrammed use of water to fill the air inlet line 72 and the air nozzle 56 to provide a flushing or purging effect is extremely important. The ability to purge the air line allows a single emulsification chamber 50 to be utilized for dispensing both foamy and nonfoamy milk, without jeopardizing the quantity of milk flow. In actuality, the length of the air supply line 72 between the air nozzle 56 and the three-way valve 100 is very short. Also, in the dispensation of hot nonfoamy milk, the presence of water remaining in the line 72 from the purge cycle prevents excess air from being drawn from the line 72 into the emulsification chamber 50. By utilizing flushing or purge water in the line 72, the presence of unwanted air is thus avoided when preparing nonfoamy hot milk.

This solves a problem that is common in many venturi-based emulsifiers that are used to prepare both foamy and nonfoamy hot milk. That is, such conventional emulsifiers tend to leak air into the milk flow even when no air is desired due to the venturi suction created in the emulsification unit. This results in a problem of inconsistent quality, both in temperature and texture, of hot, nonfoamed milk. By filling the air inlet line 72 and the air nozzle 56 with purge water following the dispensation of each quantity of a beverage 87, the present invention provides a system that not only flushes and purges milk remnants out of the air inlet line and nozzle, but also prevents air from entering the venturi chamber 60 and the emulsifying chamber 50 when the desired product is nonfoamy hot milk.

The air supply line 72 leads to the foamer head. It is connected to the emulsifier 40 by the air nozzle 56. The air supply line 72 may be utilized to perform two different functions, depending upon the manner in which the microprocessor 76 has been programmed. Specifically, the air supply line 72 may be used to (1) Allow air to flow to the emulsifier; or (2) to allow water to flow to the emulsifier 40.

The three-way valve 100 acts as a diversion valve to block flow in one direction or the other, depending upon the need for air or water. At rest, which is the default condition, the three-way valve 100 blocks the air duct 98 and thus opens communication between the water conduit 106 and the air supply line 72. Water will then flow when the water pump 104 and flush valve 109 are actuated. When foamy milk is to be dispensed the microprocessor 76 changes the position of the three-way valve 100 so that it blocks the water conduit 106 and allows air to flow from the air duct 98 through the three-way valve 100 to the air supply line 72 and on to the emulsifier 40.

The air supply line 72 may be flooded at different times for two different purposes. First, the microprocessor 76 may be programmed so that the air supply line 72 is flooded after the dispensation of a beverage to flush the emulsifier 40 and remove any milk residue both from the emulsifier 40 and also from the air supply line 72. It is possible for milk residue to enter the air supply line 72 after dispensing a beverage due to a vacuum effect that takes place in the air supply line 72. By flushing the air supply line 72 with water following dispensation of a beverage both the air supply line 72 and the emulsifier 40 are cleaned after dispensation of each beverage.

In some applications, such as in a self-service installation, it may be desirable for the microprocessor 76 to be programmed so that there is a significant delay in the flushing discharge of water following dispensation of a beverage. This might be desirable to prevent accidental scalding if a user inserts his or her hand beneath the beverage discharge duct 52 immediately upon the completion of beverage dispensing. In this situation, and in other situations as well, it may be desirable to fill the air supply line 72 for a different purpose.

The microprocessor 76 may also be used to flood the air supply line 72 immediately upon depression of either the button and 82 or the button 84 before hot nonfoamy milk is dispensed. In this case actuation of either the button 82 or the button 84 causes a small amount of water to be injected into the air supply line 72 through the three-way valve 100 just before the solenoid actuated armature 39 is energized. The air supply line 72 is thereupon flooded by the time that the valve gate 38 is opened to allow milk to flow from the discharge hose 26. This avoids the aspiration of unwanted air from the air supply line 72 during the dispensation of hot nonfoamy milk.

Undoubtedly, numerous variations and modifications of the invention will become readily apparent to those familiar with the dispensation of hot, dairy-based beverages. For example, the use of the emulsification and dispensing unit 10 is not limited to hot, foamy or nonfoamy milk. It may also be used in the dispensation of hot chocolate milk, hot milk and hot cream, and other dairy-based beverages at high temperatures. Accordingly, the scope of the invention should not be construed as limited to the specific embodiment of the emulsification and dispensing unit 10 depicted and described, but rather is defined in the claims appended hereto.

We claim:

1. In a device including a venturi-based emulsification unit for emulsifying dairy-based liquids with other fluids and dispensing an emulsified mixture of said fluids into a beverage container for consumption, the improvement comprising a housing containing a refrigerated upper compartment with a chilled reservoir of milk and having a flexible milk discharge hose having a proximal end located at and connected to said reservoir and an opposite, distal end, and said discharge hose extends from said proximal end to drain milk from said reservoir of milk and is coupled to said emulsification unit therebeneath, an electrically operated dairy liquid flow control pinch valve that acts externally upon said discharge hose and holds said discharge hose in a vertical orientation wherein said pinch valve is located between said upper compartment and said emulsification unit, and said emulsification unit includes an upwardly directed tubular milk inlet pipe located vertically beneath said pinch valve and said distal end of said discharge hose is severed and placed coaxially onto said liquid inlet pipe, whereby activation of said electrically operated dairy liquid flow control pinch valve allows gravitational flow of said milk in a straight, vertical path vertically downwardly out of said reservoir of milk and directly into said emulsification unit.

2. A device according to claim 1 wherein said chilled reservoir is comprised of a disposable container including a flexible, collapsible bag of milk and said flexible milk discharge hose extends from said box for draining milk from said bag, and said milk discharge hose extends downwardly from said upper compartment of said housing and through said dairy liquid flow control pinch valve.

3. A device according to claim 2 further comprising a solenoid actuator that operates said pinch valve.

4. A device according to claim 1 further comprising a flow restrictor having a longitudinal orifice therethrough, and said flow restrictor is inserted into upwardly directed, tubular milk inlet pipe.

* * * * *